United States Patent
Abe et al.

(10) Patent No.: US 11,434,550 B2
(45) Date of Patent: Sep. 6, 2022

(54) CUBIC BORON NITRIDE SINTERED MATERIAL AND METHOD FOR MANUFACTURING THE SAME

(71) Applicant: SUMITOMO ELECTRIC HARDMETAL CORP., Itami (JP)

(72) Inventors: Machiko Abe, Itami (JP); Satoru Kukino, Itami (JP); Michiko Matsukawa, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 16/967,572

(22) PCT Filed: Dec. 27, 2019

(86) PCT No.: PCT/JP2019/051547
§ 371 (c)(1),
(2) Date: Aug. 5, 2020

(87) PCT Pub. No.: WO2021/131051
PCT Pub. Date: Jul. 1, 2021

(65) Prior Publication Data
US 2021/0198772 A1  Jul. 1, 2021

(51) Int. Cl.
*C22C 29/16* (2006.01)
(52) U.S. Cl.
CPC .................. *C22C 29/16* (2013.01)
(58) Field of Classification Search
CPC ..................................... C22C 29/16
See application file for complete search history.

(56) References Cited

U.S. PATENT DOCUMENTS

| 4,361,543 A | 11/1982 | Zhdanovich et al. |
| 2005/0143252 A1 | 6/2005 | Okamura et al. |
| 2008/0214383 A1 | 9/2008 | Matsukawa et al. |
| 2012/0302425 A1 | 11/2012 | Okamura et al. |

FOREIGN PATENT DOCUMENTS

| JP | S55-32771 A | 3/1980 |
| JP | 2005-187260 A | 7/2005 |
| JP | 2015-202980 A | 11/2015 |
| JP | 2015-202981 A | 11/2015 |
| WO | WO-2005/066381 A1 | 7/2005 |
| WO | WO-2012/053375 A1 | 4/2012 |

OTHER PUBLICATIONS

Bezhenar et al., Physico-Mechanical Properties of cBN Composites Produced by a High-Pressure Reaction Sintering of Cubic Boron Nitride and Aluminum Powders.Journal of Superhard Materials, 2010, vol. 32, No. 1, pp. 1-13.*

* cited by examiner

*Primary Examiner* — Christopher S Kessler
(74) *Attorney, Agent, or Firm* — Faegre Drinker Riddle & Reath LLP

(57) ABSTRACT

A cubic boron nitride sintered material includes 40% by volume or more and 96% by volume or less of cubic boron nitride grains and 4% by volume or more and 60% by volume or less of a binder phase, and the cubic boron nitride grains have a dislocation density of less than $1 \times 10^5 / m^2$.

5 Claims, 3 Drawing Sheets

US 11,434,550 B2

CUBIC BORON NITRIDE SINTERED MATERIAL AND METHOD FOR MANUFACTURING THE SAME

TECHNICAL FIELD

The present disclosure relates to a cubic boron nitride sintered material and a method for manufacturing the same.

BACKGROUND ART

Cubic boron nitride (hereinafter also referred to as "cBN") has significantly high hardness, and is also excellent in thermal stability and chemical stability, and accordingly, used for cutting tools and wear resistant tools.

WO 2012/053375 (PTL 1) discloses a sintered material obtained by sintering cubic boron nitride grains with a binder phase. Patent Literature 1 discloses that wear resistance and fracture resistance are successfully improved by adjusting the composition of the binder phase.

Japanese Patent Laying-Open No. 2005-187260 (PTL 2) and WO 2005/066381 (PTL 3) disclose that a cubic boron nitride sintered material obtained by sintering cBN grains with a binder phase (hereinafter also referred to as "cBN sintered material") is successfully improved in wear resistance and fracture resistance by adjusting the amount of a catalytic element in the cBN grains.

Japanese Patent Laying-Open Nos. 2015-202980 (PTL 4) and 2015-202981 (PTL 5) disclose mixing hexagonal boron nitride (hereinafter also referred to as "hBN") powder and binder powder and sintering the mixture at super high temperature under super high pressure to obtain a cBN sintered material. The cBN sintered material contains a small amount of wurtzite boron nitride (hereinafter referred to as "wBN") and includes cBN grains of high strength, and is thus improved in wear resistance and fracture resistance.

CITATION LIST

Patent Literature

PTL 1: WO 2012/053375
PTL 2: Japanese Patent Laying-Open No. 2005-187260
PTL 3: WO 2005/066381
PTL 4: Japanese Patent Laying-open No. 2015-202980
PTL 5: Japanese Patent Laying-open No. 2015-202981

SUMMARY OF INVENTION

The presently disclosed cubic boron nitride sintered material comprises:
40% by volume or more and 96% by volume or less of cubic boron nitride grains; and 4% by volume or more and 60% by volume or less of a binder phase,
the cubic boron nitride grains having a dislocation density of less than $1 \times 10^{15}/m^2$.

The presently disclosed method for manufacturing a cubic boron nitride sintered material is a method for manufacturing the cubic boron nitride sintered material describes above, and the method comprising:
preparing hexagonal boron nitride powder and binder powder; and
heating and pressurizing the hexagonal boron nitride powder and the binder powder to a temperature of 1900° C. or higher and 2400° C. or lower and to a pressure of 8 GPa or larger through a temperature and a pressure in a stable region of wurtzite boron nitride,
the stable region of wurtzite boron nitride simultaneously satisfying Formulae 1 and 2:

$$P \geq -0.0037T + 11.301, \text{ and} \quad \text{Formula 1:}$$

$$P \leq -0.085T + 117, \quad \text{Formula 2:}$$

where T represents temperature in ° C. and P represents pressure in GPa,
the heating and pressurizing step being performed along a route entering the stable region of wurtzite boron nitride at a temperature of 600° C. or higher.

DETAILED DESCRIPTION

Figure 1:
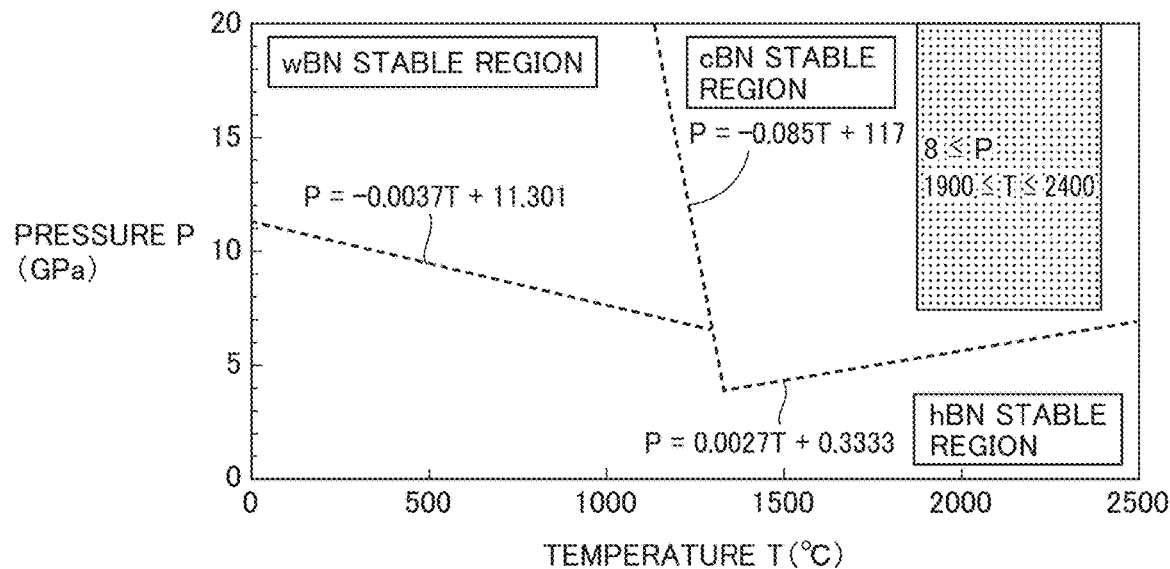
FIG. 1 is a pressure-temperature phase diagram of boron nitride.

Problems to be Solved by the Present Disclosure

In recent years, in the automobile industry, cast iron materials that are thin and still have high strength have been increasingly used to provide automobiles achieving both high performance and light weight.

Flake graphite cast iron (hereinafter, also referred to as "grey cast iron") has been generally used as a cast iron material. In recent years, among flake graphite cast irons, FC300 or the like having a higher tensile strength than FC200 tends to be used. Furthermore, a ratio of using vermiculite cast iron and spheroidal graphite cast iron having higher strength than flake graphite cast iron is also increasing. Furthermore, among spheroidal graphite cast irons, FCD600 and FCD700 having higher tensile strength than FCD450 tend to be used.

In addition to these changes of materials, a tendency to demand high efficiency machining in order to improve productivity is also accelerated. In other words, there is a need for a tool that can have a long tool life even when it is used for high efficiency processing of a high-strength cast iron material.

Therefore, an object of the present invention is to provide a cubic boron nitride sintered material that, when used as a material for a tool, allows the tool to have a long life even when it is used for high efficiency processing of a high-strength cast iron material.

Advantageous Effect of the Present Disclosure

When the presently disclosed cubic boron nitride sintered material is used as a material for a tool, the cubic boron nitride sintered material allows the tool to have a long life even when it is used for high efficiency processing of a high-strength cast iron material.

Summary of Embodiments

Initially, embodiments of the present disclosure will be enumerated and specifically described.

(1) The presently disclosed cubic boron nitride sintered material comprises: 40% by volume or more and 96% by volume or less of cubic boron nitride grains; and 4% by volume or more and 60% by volume or less of a binder phase, the cubic boron nitride grains having a dislocation density of less than $1 \times 10^{15}/m^2$.

When the presently disclosed cubic boron nitride sintered material is used as a material for a tool, the cubic boron nitride sintered material allows the tool to have a long life even when it is used for high efficiency processing of a high-strength cast iron material.

(2) The binder phase preferably includes:
at least one selected from the group consisting of: a simple substance selected from the group consisting of a group 4 element, a group 5 element and a group 6 element of the periodic table, aluminum, silicon, cobalt and nickel; an alloy thereof; and an intermetallic compound thereof;
at least one selected from the group consisting of: a compound consisting of at least one element selected from the group consisting of a group 4 element, a group 5 element and a group 6 element of the periodic table, aluminum, silicon, cobalt and nickel, and at least one element selected from the group consisting of nitrogen, carbon, boron and oxygen; and a solid solution derived from the compound; or
at least one selected from the group consisting of a simple substance selected from the group consisting of a group 4 element, a group 5 element and a group 6 element of the periodic table, aluminum, silicon, cobalt and nickel, an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel and at least one element selected from the group consisting of nitrogen, carbon, boron and oxygen, and a solid solution derived from the compound.

This provides a further increased tool life.

(3) The presently disclosed method for manufacturing a cubic boron nitride sintered material is a method for manufacturing the cubic boron nitride sintered material described above, and the method comprises:

preparing hexagonal boron nitride powder and binder powder; and heating and pressurizing the hexagonal boron nitride powder and the binder powder to a temperature of 1900° C. or higher and 2400° C. or lower and to a pressure of 8 GPa or larger through a temperature and a pressure in a stable region of wurtzite boron nitride, the stable region of wurtzite boron nitride simultaneously satisfying Formulae 1 and 2:

$$P \geq -0.0037T + 11.301, \text{ and} \quad \text{Formula 1:}$$

$$P \leq -0.085T + 117, \quad \text{Formula 2:}$$

where T represents temperature in ° C. and P represents pressure in GPa, the heating and pressurizing step being performed along a route entering the stable region of wurtzite boron nitride at a temperature of 600° C. or higher.

This can provide a cubic boron nitride sintered material that, when used as a material for a tool, allows the tool to have a long life even when it is used for high efficiency processing of a high-strength cast iron material.

Detailed Description of Embodiments

Initially the present inventors have observed how a tool using a conventional cubic boron nitride sintered material is damaged when it is used in high efficiency processing of a high-strength cast iron material, and studied why the tool is damaged. As a result, the present inventors have found that the cubic boron nitride sintered material has insufficient thermal conductivity, and when the tool is used for high-efficiency processing of a high-strength cast iron material, in particular, the temperature of and in a vicinity of a point of the tool in contact with the workpiece increases, which facilitates flank wear.

The present inventors have conducted more detailed studies on factors affecting the thermal conductivity of the cubic boron nitride sintered material. As a result, the present inventors have found that the dislocation density of the cubic boron nitride grains affects the thermal conductivity of the cubic boron nitride sintered material and is closely related to the tool's life.

As a result of intensive studies based on the above findings, the present inventors have completed the presently disclosed cubic boron nitride sintered material and method for manufacturing the same.

Hereinafter, when a compound or the like is represented by a chemical formula in the present specification describing the presently disclosed cubic boron nitride sintered material and method for manufacturing the same without specifying any specific atomic ratio, it includes any conventionally known atomic ratio and is not necessarily limited to what falls within a stoichiometric range. For example, for "TiC," the ratio of the number of atoms constituting TiC includes any conventionally known atomic ratio.

Embodiment 1: Cubic Boron Nitride Sintered Material

A cubic boron nitride sintered material according to one embodiment of the present disclosure is a cubic boron nitride sintered material comprising 40% by volume or more and 96% by volume or less of cubic boron nitride grains and 4% by volume or more and 60% by volume or less of a binder phase, and the cubic boron nitride grains have a dislocation density of less than $1 \times 10^{15}/m^2$.

When the presently disclosed cubic boron nitride sintered material is used as a material for a tool, the cubic boron nitride sintered material allows the tool to have a long life even when it is used for high efficiency processing of a high-strength cast iron material, in particular. A reason for this is inferred as indicated by items (i) and (ii) below:

(i) The presently disclosed cubic boron nitride sintered material includes 40% by volume or more and 96% by volume or less of cBN grains high in hardness, strength and toughness. For this reason, it is inferred that the cubic boron nitride sintered material has excellent wear resistance and excellent fracture resistance, and hence allows an extended tool life.

(ii) In the presently disclosed cubic boron nitride sintered material, the cubic boron nitride grains have a dislocation density of less than $1\times10^5/m^2$. The cubic boron nitride grains are enhanced in thermal conductivity. Accordingly, the cubic boron nitride sintered material including the cubic boron nitride grains is also enhanced in thermal conductivity. Therefore, even when a tool using the cubic boron nitride sintered material is used for high-efficiency processing of a high-strength cast iron material, the temperature of and in a vicinity of a point of the tool in contact with the workpiece is not easily increased, which suppresses crater wear and it is thus inferred that an extended tool life is provided.

While in the above description the tool using the presently disclosed cubic boron nitride sintered material has a long tool life in high-efficiency processing of a high-strength cast iron material, the workpiece is not limited thereto. Examples of the workpiece include chromium molybdenum steel (SCM415), carbon steel for machine structure (S50C), high carbon chromium bearing steel (SUJ2, SUJ4), and alloy tool steel (SKD11).

(Composition of Cubic Boron Nitride Sintered Material)

The presently disclosed cubic boron nitride sintered material includes 40% by volume or more and 96% by volume or less of cubic boron nitride grains and 4% by volume or more and 60% by volume or less of a binder phase. Note that the cBN sintered material may contain inevitable impurities resulting from raw materials, manufacturing conditions, and the like.

The cBN sintered material preferably contains cBN grains at a ratio with a lower limit of 40% by volume or more, more preferably 45% by volume or more. The cBN sintered material preferably contains cBN grains at the ratio with an upper limit of 96% by volume or less, more preferably 90% by volume or less. The cBN sintered material preferably contains cBN grains at a ratio of 40% by volume or more and 96% by volume or less, more preferably 45% by volume or more and 90% by volume or less.

The cBN sintered material preferably contains a binder phase at a ratio with a lower limit of 4% by volume or more, more preferably 10% by volume or more. The cBN sintered material preferably contains the binder phase at the ratio with an upper limit of 60% by volume or less, more preferably 55% by volume or less. The cBN sintered material contains the binder phase at a ratio of 4% by volume or more and 60% by volume or less, preferably 10% by volume or more and 55% by volume or less.

The cBN sintered material's cBN grain content ratio (vol %) and binder phase content ratio (vol %) can be confirmed by subjecting the cBN sintered material to structural observation, elemental analysis, and the like by using an energy dispersive X-ray analyzer (EDX) (Octan Elect EDS system) accompanying a scanning electron microscope (SEM) ("JSM-7800F" (trade name) manufactured by JEOL Ltd.) (hereinafter also referred to as an "SEM-EDX"). The content ratios are specifically measured in the following method.

Initially, the cBN sintered material is cut at a desired part to prepare a sample including a cross section of the cBN sintered material. The cross section can be prepared using a focused ion beam device, a cross section polisher, or the like. Subsequently, the cross section is observed with an SEM with a magnification of 5,000 times to obtain a backscattered electron image. In the backscattered electron image, a region where cBN grains are present will be a black region and a region where the binder phase is present will be a gray region or a white region.

Subsequently, the backscattered electron image is binarized using image analysis software ("WinROOF" by Mitani Corporation). From the binarized image, an areal ratio of pixels that are attributed to a dark field in the area of the field of view for measurement (i.e., pixels attributed to cBN grains) is calculated. The calculated areal ratio can be regarded as a value in % by volume, and a cBN grain content ratio (vol %) can thus be obtained.

From the binarized image, an areal ratio of pixels that are attributed to a bright field in the area of the field of view for measurement (i.e., pixels attributed to the binder phase) can be calculated to obtain a binder phase content ratio (vol %).

As measured by the applicant, it has been confirmed that, for measurement of the cBN sintered material's cBN grain content ratio (vol %) and binder phase content ratio (vol %) in the same sample, while a location where a field of view for measurement is selected is changed and calculation is thus performed for a plurality of times, measurement results are obtained without substantial variation and thus there is no arbitrariness even with a field of view set, as desired, for measurement.

The fact that the pixels attributed to the dark field are attributed to cBN grains can be confirmed by subjecting the cBN sintered material to elemental analysis with SEM-EDX.

(Inevitable Impurities)

The presently disclosed cubic boron nitride sintered material may contain inevitable impurities in a range in which an effect of the present disclosure is exhibited. The inevitable impurities can for example be hydrogen, oxygen, and carbon. When the cubic boron nitride sintered material includes inevitable impurities, the inevitable impurities are preferably contained in an amount of 0.1% by mass or less. The content of the inevitable impurities can be measured through secondary ion mass spectrometry (SIMS).

«Cubic Boron Nitride Grains»

(Dislocation Density)

The presently disclosed cubic boron nitride sintered material includes cubic boron nitride grains having a dislocation density of less than $1\times10^{15}/m^2$. The cubic boron nitride grains are higher in thermal conductivity than conventional cubic boron nitride grains. Accordingly, the cubic boron nitride sintered material including the cubic boron nitride grains is also enhanced in thermal conductivity. Therefore, even when a tool using the cubic boron nitride sintered material is used for high-efficiency processing of a high-strength cast iron material, the temperature of and in a vicinity of a point of the tool in contact with the workpiece is not easily increased, which suppresses flank wear and it is thus inferred that an extended tool life is provided.

The cubic boron nitride grains have a dislocation density with an upper limit of less than $1\times10^{15}/m^2$, preferably $9.0\times10^{14}/m^2$ or less, more preferably $8.0\times10^{14}/m^2$ or less. While the dislocation density's lower limit is not particularly limited, it is $1\times10^{14}/m^2$ or more from the viewpoint of manufacture.

As described herein, the cubic boron nitride grains' dislocation density is measured in a large-scale synchrotron radiation facility (e.g., SPring-8 (located in Hyogo Prefecture)). Specifically, it is measured in the following method.

Initially, a sample of the cubic boron nitride sintered material is introduced into a container and sealed therein, and in the container the sample is immersed in fluoronitric acid (hydrofluoric acid:nitric acid=5:5, which is a ratio in volume), at 140° C. for 48 hours. As a result, the binder phase completely dissolves in the fluoronitric acid, and the cBN grains remain alone. The cBN grains are introduced into a 0.3 mmφ capillary manufactured by TOHO for X-ray crystallography ("Mark Tube" (trademark)) manufactured by TOHO) and thus prepared as a sealed-off specimen.

The specimen was subjected to X-ray diffraction measurement under the following conditions, and a line profile of a diffraction peak from each orientation plane of cubic boron nitride's major orientations which are (111), (200), (220), (311), (400) and (531) is obtained.

(Conditions for X-Ray Diffraction Measurement)
X-ray source: synchrotron radiation
Condition for equipment: detector MYTHEN
Energy: 18 keV (wavelength: 0.6888 angstrom)
Camera length: 573 mm
Measurement peak: six peaks from cubic boron nitride's (111), (200), (220), (311), (400), and (531). When it is difficult to obtain a profile depending on texture and orientation, the peak for that Miller index is excluded.

Measuring condition: there are 9 or more measurement points set in the full width at half maximum corresponding to each measurement peak. Peak top intensity is set to 2000 counts or more. Peak tail is also used in the analysis, and accordingly, the measurement range is set to about 10 times the full width at half maximum.

A line profile obtained from the above X-ray diffraction measurement will be a profile including both a true broadening attributed to a physical quantity such as the sample's inhomogeneous strain and a broadening attributed to the equipment. In order to determine inhomogeneous strain and crystallite size, a component attributed to the equipment is removed from the measured line profile to obtain a true line profile. The true line profile is obtained by fitting the obtained line profile and the line profile that is attributed to the equipment by a pseudo Voigt function, and subtracting the line profile attributed to the equipment. $LaB_6$ was used as a standard sample for removing a broadening of a diffracted wave attributed to the equipment. When significantly collimated radiation is used, a broadening of a diffracted wave attributed to the equipment may be regarded as zero.

The obtained true line profile is analyzed using the modified Williamson-Hall method and the modified Warren-Averbach method to calculate dislocation density. The modified Williamson-Hall method and the modified Warren-Averbach method are known line profile analysis methods used for determining dislocation density.

The modified Williamson-Hall method's expression is represented by the following expression (I):

$$\Delta K = \frac{0.9}{D} + \left(\frac{\pi M^2 b^2}{2}\right)^{1/2} \rho^{1/2} K C^{1/2} + O(K^2 C) \quad (1)$$

where $\Delta K$ represents a half width of a line profile, D represents a crystallite size, M represents a dislocation parameter, b represents a Burgers vector, $\rho$ represents dislocation density, K represents a scattering vector, $O(K^2 C)$ represents a higher-order term of $K^2 C$, and C represents an average contrast factor.

C in the above expression (I) is represented by the following expression (II):

$$C = C_{h00}[1-q(h^2k^2+h^2l^2+k^2l^2)/(h^2+k^2+l^2)^2] \quad (II).$$

In the above expression (II), a contrast factor $C_{h00}$ for screw dislocation and that for edge dislocation and a coefficient q for each contrast factor are obtained by using the computing code ANIZC, with a slip system of <110>{111}, and elastic stiffness $C_{11}$, $C_{12}$ and $C_{44}$ of 8.44 GPa, 1.9 GPa and 4.83 GPa, respectively. Contrast factor $C_{h00}$ is 0.203 for screw dislocation and 0.212 for edge dislocation. The coefficient q for the contrast factor is 1.65 for screw dislocation and 0.58 for edge dislocation. Note that screw dislocation's ratio is fixed to 0.5 and edge dislocation's ratio is fixed to 0.5.

Furthermore, between dislocation and inhomogeneous strain, a relationship represented by an expression (III) is established using contrast factor C, as below:

$$<\varepsilon(L)^2> = (\rho C b^2/4\pi)\ln(R_e/L) \quad (III),$$

where $R_e$ represents dislocation's effective radius.

By the relationship of the above expression (III) and the Warren-Averbach expression, the following expression (IV) can be presented, and as the modified Warren-Averbach method, dislocation density $\rho$ and a crystallite size can be determined.

$$\ln A(L) = \ln A^S(L) - (\pi L^2 \rho b^2/2)\ln(R_e/L)(K^2 C) + O(K^2 C)^2 \quad (IV),$$

where $A(L)$ represents a Fourier series, $A^S(L)$ represents a Fourier series for a crystallite size, and L represents a Fourier length.

For details of the modified Williamson-Hall method and the modified Warren-Averbach method, see T. Ungar and A. Borbely, "The effect of dislocation contrast on x-ray line broadening: A new approach to line profile analysis," Appl. Phys. Lett., vol. 69, no. 21, p. 3173, 1996, and T. Ungar, S. Ott, P. Sanders, A. Borbely, J. Weertman, "Dislocations, grain size and planar faults in nanostructured copper determined by high resolution X-ray diffraction and a new procedure of peak profile analysis," Acta Mater., vol. 46, no. 10, pp. 3693-3699, 1998.

As measured by the applicant, it has been confirmed that, for measurement of the cBN grains' dislocation density in the same sample, while a location where a measurement range is selected is changed and calculation is thus performed for a plurality of times, measurement results are obtained without substantial variation and there is no arbitrariness even with a field of view set, as desired, for measurement.

«Binder phase»

The presently disclosed cBN sintered material comprises a binder phase that includes:

at least one selected from the group consisting of a simple substance selected from the group consisting of a group 4 element, a group 5 element and a group 6 element of the periodic table, aluminum, silicon, cobalt and nickel (hereinafter also referred to as "the group A"), an alloy thereof, and an intermetallic compound thereof;

at least one selected from the group consisting of: a compound consisting of at least one element selected from the group consisting of a group 4 element, a group 5 element and a group 6 element of the periodic table, aluminum, silicon, cobalt and nickel (or the group A) and at least one element selected from the group consisting of nitrogen, carbon, boron and oxygen (hereinafter also referred to as "the group B"); and a solid solution derived from the compound; or at least one selected from the group consisting of a simple substance selected from the group consisting of a group 4 element, a group 5 element and a group 6 element of the periodic table, aluminum, silicon, cobalt and nickel (or the group A), an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel (or the group A) and at least one element selected from the group consisting of nitrogen, carbon, boron and oxygen (or the group B), and a solid solution derived from the compound. That is, the binder phase can be in any of the following forms (a) to (f):

(a) The binder phase consists of at least one of a simple substance, an alloy, and an intermetallic compound of the group A.

(b) The binder phase includes at least one of a simple substance, an alloy, and an intermetallic compound of the group A.

(c) The binder phase consists of at least one selected from the group consisting of a compound consisting of at least one element selected from the group A and at least one element selected from the group B, and a solid solution derived from the compound.

(d) The binder phase includes at least one selected from the group consisting of a compound consisting of at least one element selected from the group A and at least one element selected from the group B, and a solid solution derived from the compound.

(e) The binder phase consists of at least one selected from the group consisting of at least one of a simple substance, an alloy, and an intermetallic compound of the group A, and a compound consisting of at least one element selected from the group A and at least one element selected from the group B and a solid solution derived from the compound.

(f) The binder phase includes at least one selected from the group consisting of at least one of a simple substance, an alloy, and an intermetallic compound of the group A, and a compound consisting of at least one element selected from the group A and at least one element selected from the group B and a solid solution derived from the compound.

The binder phase has a lower reactivity with iron than cBN, and thus plays a role of suppressing chemical wear and thermal wear in cutting of a high-strength cast iron material. That is, the cBN sintered material with a binder phase contained therein enhances wear resistance in high-efficiency processing of a high-strength cast iron material.

The group 4 element of the periodic table includes titanium (Ti), zirconium (Zr) and hafnium (Hf) for example. The group 5 element of the periodic table includes vanadium (V), niobium (Nb) and tantalum (Ta) for example. The group 6 element of the periodic table includes chromium (Cr), molybdenum (Mo) and tungsten (W) for example. Hereinafter, the group 4 element, the group 5 element, the group 6 element, aluminum, silicon, cobalt, and nickel are also referred to as a "first metal element."

Examples of the alloy of the first metal element include Ti—Zr, Ti—Hf, Ti—V, Ti—Nb, Ti—Ta, Ti—Cr, and Ti—Mo. Examples of the intermetallic compound of the first metal element include $TiCr_2$, $Ti_3Al$ and Co—Al.

Examples of the compound including the first metal element and nitrogen (i.e. a nitride) include titanium nitride (TiN), zirconium nitride (ZrN), hafnium nitride (HfN), vanadium nitride (VN), niobium nitride (NbN), tantalum nitride (TaN), chromium nitride ($Cr_2N$), molybdenum nitride (MoN), tungsten nitride (WN), aluminum nitride (AlN), silicon nitride ($Si_3N_4$), cobalt nitride (CoN), nickel nitride (NiN), titanium zirconium nitride (TiZrN), titanium hafnium nitride (TiHfN), titanium vanadium nitride (TiVN), titanium niobium nitride (TiNbN), titanium tantalum nitride (TiTaN), titanium chromium nitride (TiCrN), titanium molybdenum nitride (TiMoN), titanium tungsten nitride (TiWN), titanium aluminum nitride (TiAN, $Ti_2AlN$, $Ti_3AlN$), zirconium hafnium nitride (ZrHfN), zirconium vanadium nitride (ZrVN), zirconium niobium nitride (ZrNbN), zirconium tantalum nitride (ZrTaN), zirconium chromium nitride (ZrCrN), zirconium molybdenum nitride (ZrMoN), zirconium tungsten nitride (ZrWN), hafnium vanadium nitride (HfVN), hafnium niobium nitride (HfNbN), hafnium tantalum nitride (HfTaN), hafnium chromium nitride (HfCrN), hafnium molybdenum nitride (HfMoN), hafnium tungsten nitride (HfN), vanadium niobium nitride (VNbN), vanadium tantalum nitride (VTaN), vanadium chromium nitride (VCrN), vanadium molybdenum nitride (VMoN), vanadium tungsten nitride (VWN), niobium tantalum nitride (NbTaN), niobium chromium nitride (NbCrN), niobium molybdenum nitride (NbMoN), niobium tungsten nitride (NbWN), tantalum chromium nitride (TaCrN), tantalum molybdenum nitride (TaMoN), tantalum tungsten nitride (TaWN), chromium molybdenum nitride (CrMoN), chromium tungsten nitride (CrWN), and molybdenum chromium nitride (MoWN).

Examples of the compound including the first metal element and carbon (i.e. a carbide) include titanium carbide (TiC), zirconium carbide (ZrC), hafnium carbide (HfC), vanadium carbide (VC), niobium carbide (NbC), tantalum carbide (TaC), chromium carbide ($Cr_3C_2$), molybdenum carbide (MoC), tungsten carbide (WC), silicon carbide (SiC), and tungsten-cobalt carbide ($W_2Co_3C$).

Examples of the compound including the first metal element and boron (i.e., a boride) include titanium boride ($TiB_2$), zirconium boride ($ZrB_2$), hafnium boride ($HfB_2$), vanadium boride ($VB_2$), niobium boride ($NbB_2$), tantalum boride ($TaB_2$), chromium boride (CrB), molybdenum boride (MoB), tungsten boride (WB), aluminum boride ($AlB_2$), cobalt boride ($CO_2B$), and nickel boride ($Ni_2B$).

Examples of the compound including the first metal element and oxygen (i.e., an oxide) include titanium oxide ($TiO_2$), zirconium oxide ($ZrO_2$), hafnium oxide ($HfO_2$), vanadium oxide ($V_2O_5$), niobium oxide ($Nb_2O_5$), tantalum oxide ($Ta_2O_5$), chromium oxide ($Cr_2O_3$), molybdenum oxide ($MoO_3$), tungsten oxide ($WO_3$), aluminum oxide ($Al_2O_3$), silicon oxide ($SiO_2$), cobalt oxide (CoO), and nickel oxide (NiO).

Examples of the compound including the first metal element, carbon and nitrogen (i.e., a carbonitride) include titanium carbonitride (TiCN), zirconium carbonitride (ZrCN), hafnium carbonitride (HfCN), titanium niobium carbonitride (TiNbCN), titanium zirconium carbonitride (TiZrCN), titanium tantalum carbonitride (TiTaCN), titanium hafnium carbonitride (TiHfCN), and titanium chromium carbonitride (TiCrCN).

Examples of the compound including the first metal element, oxygen, and nitrogen (i.e., an oxynitride) include titanium oxynitride (TiON), zirconium oxynitride (ZrON), hafnium oxynitride (HfON), vanadium oxynitride (VON), niobium oxynitride (NbON), tantalum oxynitride (TaON), chromium oxynitride (CrON), molybdenum oxynitride (MoON), tungsten oxynitride (WON), aluminum oxynitride (AlON), and silicon oxynitride (SiAlON).

The solid solution derived from the compound means a state in which two or more types of these compounds are dissolved in each other's crystal structure, and means an interstitial solid solution, a substitutional solid solution or the like.

The above compound may be one type of compound or two or more types of compounds in combination.

The total content of the compound and the solid solution derived from the compound in the binder phase is measured in the RIR (Reference Intensity Ratio) method through XRD.

The binder phase may include a component other than the above compound. Examples of an element constituting the other component can include manganese (Mn) and rhenium (Re).

The composition of the binder phase included in the cBN sintered material can be determined through XRD (X-ray diffraction).

<Applications>

The presently disclosed cubic boron nitride sintered material is suitably applied to cutting tools, wear resistant tools, grinding tools, and the like.

The cutting, wear resistant and grinding tools using the presently disclosed cubic boron nitride sintered material may entirely be composed of the cubic boron nitride sintered material or may only have a portion (e.g., a cutting edge for a cutting tool) composed of the cubic boron nitride sintered material. Furthermore, a coating film may be formed on a surface of each tool.

The cutting tool can include drills, end mills, indexable cutting inserts for drills, indexable cutting inserts for end mills, indexable cutting inserts for milling, indexable cutting inserts for turning, metal saws, gear cutting tools, reamers, taps, and the like.

The wear resistant tool can include dies, scribers, scribing wheels, and dressers, and the like. The grinding tool can include grinding stone and the like.

Embodiment 2: Method for Manufacturing a Cubic Boron Nitride Sintered Material

Figure 2:
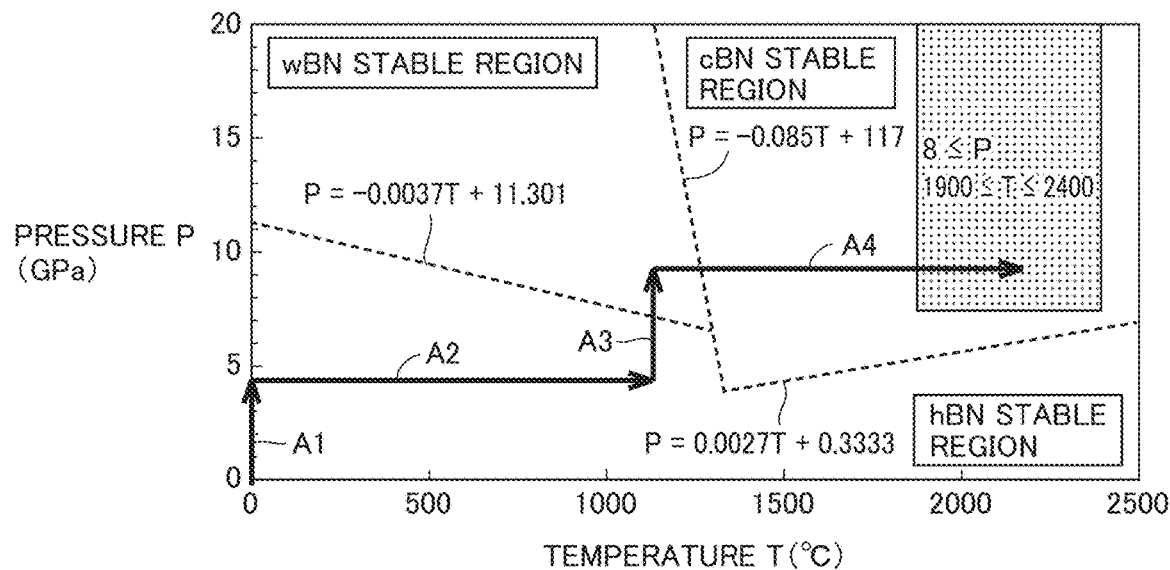
FIG. 2 is a diagram for illustrating a method for manufacturing a polycrystalline cubic boron nitride (a pattern A) according to an embodiment of the present disclosure.
Figure 3:
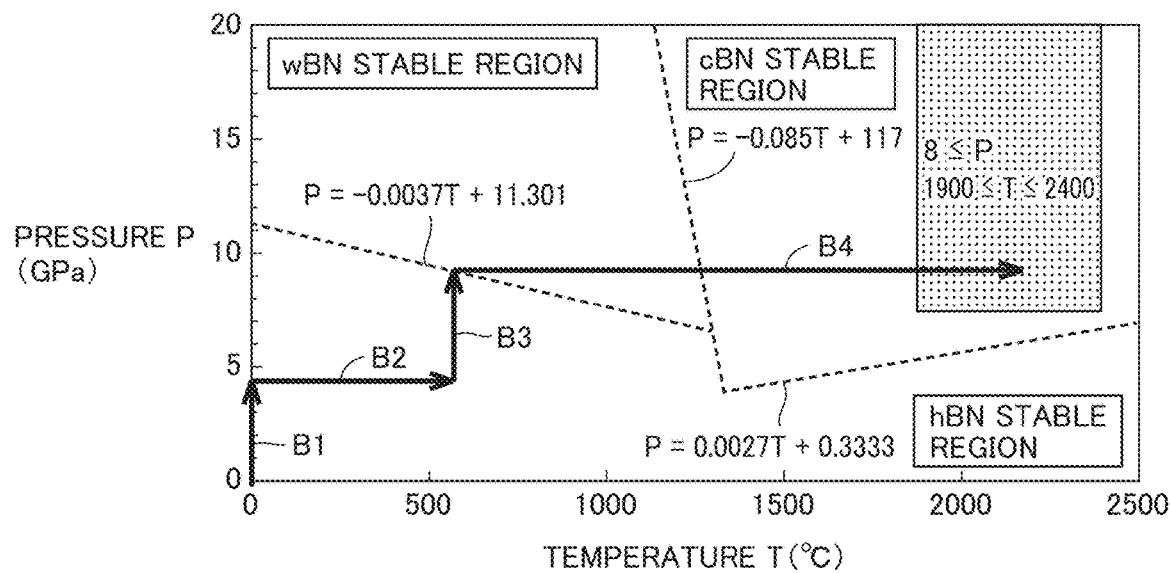
FIG. 3 is a diagram for illustrating a method for manufacturing a polycrystalline cubic boron nitride (a pattern B) according to another embodiment of the present disclosure.
Figure 4:
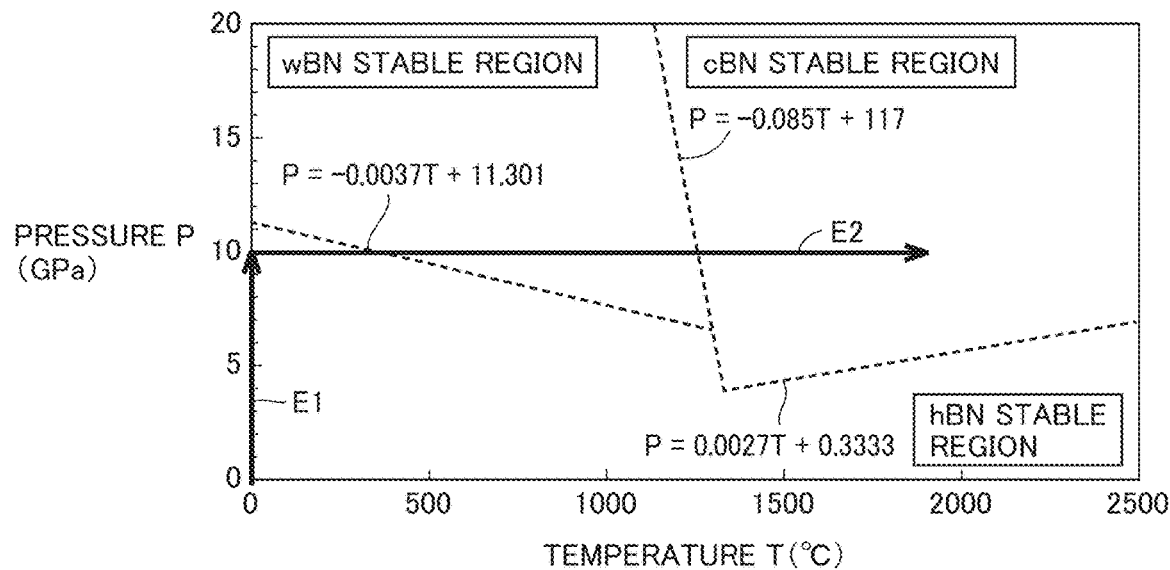
FIG. 4 is a diagram for illustrating an example of a method for manufacturing a polycrystalline cubic boron nitride, as conventional.
Figure 5:
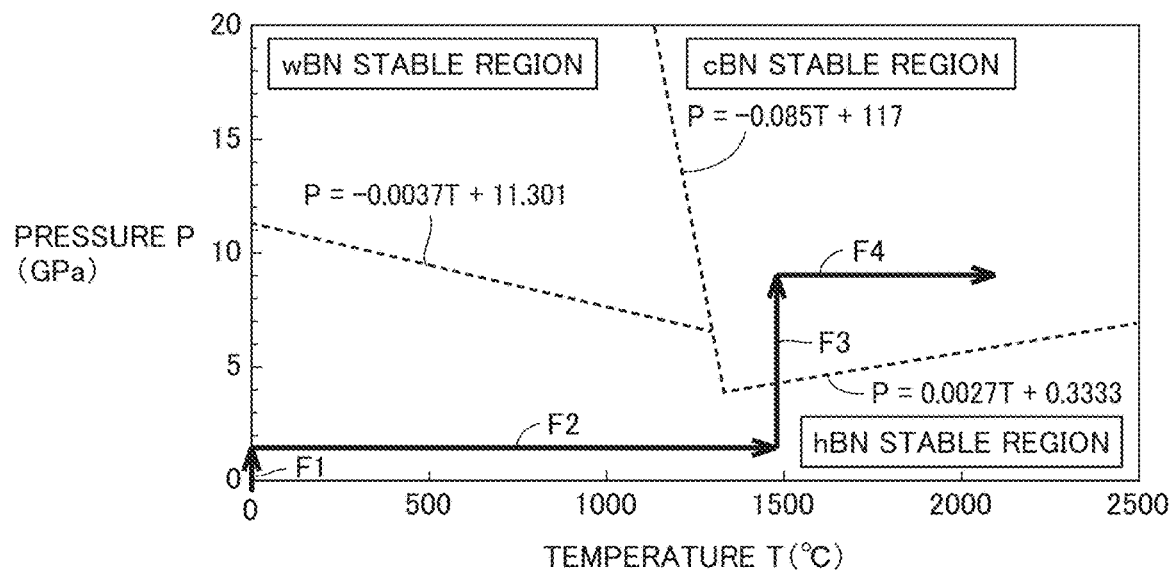
FIG. 5 is a diagram for illustrating an example of a method for manufacturing a polycrystalline cubic boron nitride as a reference.
Figure 6:
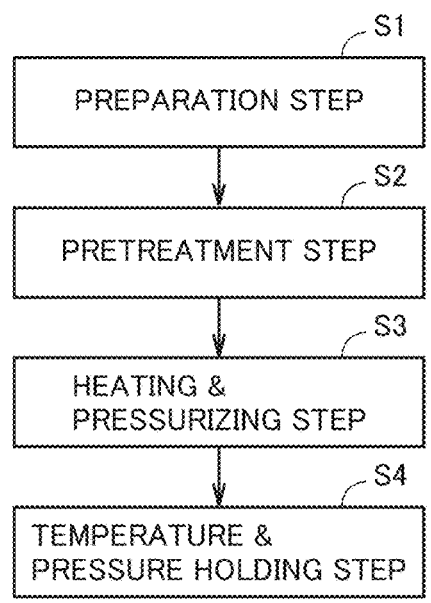
FIG. 6 is a flowchart of a method for manufacturing a cubic boron nitride sintered material according to an embodiment of the present disclosure.

A method for manufacturing a cubic boron nitride sintered material according to an embodiment of the present disclosure will be described with reference to FIGS. 1 to 5. FIG. 1 is a pressure-temperature phase diagram of boron nitride. FIGS. 2 and 3 are diagrams for illustrating a method for manufacturing a cubic boron nitride sintered material according to an embodiment of the present disclosure. FIG. 4 is a diagram for illustrating an example of a method for manufacturing a cubic boron nitride sintered material, as conventional. FIG. 5 is a diagram for illustrating an example of a method for manufacturing a cubic boron nitride sintered material as a reference. FIG. 6 is a flowchart of a method for manufacturing a cubic boron nitride sintered material according to an embodiment of the present disclosure.

The method for manufacturing a cubic boron nitride sintered material according to the present embodiment is a method for manufacturing a cubic boron nitride sintered material according to the first embodiment, and the method comprises: preparing hexagonal boron nitride powder (hereinafter also referred to as "hBN powder") and binder powder (hereinafter also referred to as "the preparation step" and denoted in FIG. 6 by S1); and heating and pressurizing the hexagonal boron nitride powder and the binder powder to a temperature of 1900° C. or higher and 2400° C. or lower and to a pressure of 8 GPa or larger through a temperature and a pressure in a stable region of wurtzite boron nitride (hereinafter also referred to as "the heating and pressurizing step" and denoted in FIG. 6 by S3), the stable region of wurtzite boron nitride simultaneously satisfying Formulae 1 and 2:

$P \geq -0.0037T + 11.301$, and  Formula 1:

$P \leq -0.085T + 117$,  Formula 2:

where T represents temperature in ° C. and P represents pressure in GPa, the heating and pressurizing step being performed along a route entering the stable region of wurtzite boron nitride at a temperature of 600° C. or higher.

The method for manufacturing a cubic boron nitride sintered material according to the present embodiment may further comprise, before the heating and pressurizing step, pressurizing the hexagonal boron nitride powder to a pressure of 0.5 GPa or more and 6 GPa or less at a temperature held in a range of −50° C. or higher and 100° C. or lower (hereinafter also referred to as "the pretreatment step" and denoted in FIG. 6 by S2).

The method for manufacturing a cubic boron nitride sintered material according to the present embodiment may further comprise, after the heating and pressurizing step, holding the cubic boron nitride sintered material that is obtained through the heating and pressurizing step at a temperature of 1900° C. or higher and 2400° C. or lower and a pressure of 8 GPa or more for 10 minutes or longer (hereinafter also referred to as "the temperature and pressure holding step" and denoted in FIG. 6 by S4).

First, before specifically describing the method for manufacturing a cubic boron nitride sintered material according to the present embodiment, a method for manufacturing a cubic boron nitride sintered material, as conventional, and a method for manufacturing a cubic boron nitride sintered material as a reference will be described for better understanding.

As shown in FIG. 1, boron nitride has three phases of hexagonal boron nitride that is a stable phase at normal temperature and normal pressure, cubic boron nitride that is a stable phase at high temperature and high pressure, and wurtzite boron nitride that is a metastable phase during transition from hexagonal boron nitride to cubic boron nitride.

A boundary between the phases can be represented by a linear function. In the present specification, it is assumed that the temperature and pressure in the stable region of each phase can be represented by a linear function.

In the present specification, the temperature and pressure in the stable region of wurtzite boron nitride (shown in FIG. 1 as a "wBN stable region") are defined as a temperature and a pressure that simultaneously satisfy Formulae 1 and 2:

$P \geq -0.0037T + 11.301$, and  Formula 1:

$P \leq -0.085T + 117$,  Formula 2:

where T represents temperature in ° C. and P represents pressure in GPa.

In the present specification, the temperature and pressure in the stable region of hexagonal boron nitride (shown in FIG. 1 as an "hBN stable region") are defined as a temperature and a pressure that simultaneously satisfy Formulae A and B indicated below or simultaneously satisfy Formulae C and D indicated below:

$P \leq -0.0037T + 11.301$ and  Formula A:

$P \leq -0.085T + 117$; or  Formula B:

$P \leq 0.0027T + 0.3333$ and  Formula C:

$P \geq -0.085T + 117$,  Formula D:

where T represents temperature in ° C. and P represents pressure in GPa.

In the present specification, the temperature and pressure in the stable region of cubic boron nitride (indicated in FIG. 1 as a "cBN stable region") are defined as a temperature and a pressure that simultaneously satisfy Formulae D and E:

$$P \leq -0.085T + 117 \text{ and} \qquad \text{Formula D:}$$

$$P \geq 0.0027T + 0.3333, \qquad \text{Formula E:}$$

where T represents temperature in °C. and P represents pressure in GPa.

In the method according to the present embodiment, hexagonal boron nitride powder and binder powder are heated to a temperature of 1900° C. or higher and 2400° C. or lower and pressurized to a pressure of 8 GPa or larger through a temperature and a pressure in the stable region of wurtzite boron nitride. This temperature and pressure allow an obtained cubic boron nitride to exhibit excellent tool performance.

Conventionally, as a route for temperature and pressure to cause hexagonal boron nitride to reach a temperature (1900° C. or higher and 2400° C. or lower) and a pressure (8 GPa or larger) in the stable region of cubic boron nitride that can provide cubic boron nitride allowing a tool to exhibit excellent performance, a route shown in FIG. 4 has been studied (hereinafter also referred to as "the route in FIG. 4").

Along the route in FIG. 4, from a starting temperature and a starting pressure (normal temperature and normal pressure), the pressure is raised to a pressure in the stable region of cubic boron nitride (e.g., 10 GPa or larger) (as indicated in FIG. 4 by an arrow E1), and subsequently, the temperature is raised to a temperature in the stable region of cubic boron nitride (e.g., 1900° C. or higher) (as indicated in FIG. 4 by an arrow E2). The route in FIG. 4 has conventionally been employed as heating and pressurizing are each performed once and can thus be performed through a simply controlled operation.

However, when the route in FIG. 4 is followed, the route enters the stable region of wurtzite boron nitride at less than 600° C., so that atomic diffusion is less likely to occur, and the phase transition from hexagonal boron nitride to wurtzite boron nitride is mainly non-diffusive phase transition. Therefore, the obtained cubic boron nitride sintered material is likely to have lattice defects and coarse grains. Therefore, this cubic boron nitride is subject to sudden fracture during a working process and hence tends to provide a shorter tool life.

In contrast, phase transition temperature may be raised to facilitate atomic diffusion. For example, when the route shown in FIG. 5 is followed, from a starting temperature and a starting pressure (normal temperature and normal pressure), the temperature and the pressure are raised to a temperature and a pressure in the stable region of cubic boron nitride (e.g., 1500° C. and 9 GPa), respectively, (as indicated in FIG. 5 by arrows F1, F2 and F3) without passing through the stable region of wurtzite boron nitride, and subsequently, the temperature is further raised (for example to 2100° C.) (as indicated in FIG. 5 by an arrow F4).

When the route of FIG. 5 is followed, hexagonal boron nitride undergoes a direct phase transition to cubic boron nitride. However, hexagonal boron nitride and cubic boron nitride have significantly different crystal structures, and lattice defects easily occur during the phase transition. Therefore, the cubic boron nitride tends to provide shorter tool life. Further, hexagonal boron nitride having a crystal structure significantly different from that of cubic boron nitride is transformed into cubic boron nitride by less than 98.5% by volume. Therefore, when the obtained cubic boron nitride sintered material is used to form a tool, the tool presents impaired performance.

As described above, when conventionally studied temperature and pressure routes are followed, it is difficult to suppress generation of lattice defects, and a cubic boron nitride sintered material providing an excellent tool life cannot be manufactured. Under these circumstances, the present inventors have diligently studied pressure and temperature routes, and as a result, found that treating hexagonal boron nitride and binder powder at a temperature and a pressure as specified in the above heating and pressurizing step can provide a cubic boron nitride sintered material with suppressed lattice defects and providing a tool with a long life even when the tool is used in high-efficiency processing of a high-strength cast iron material. The steps of the method according to the present embodiment will now be described below more specifically with reference to FIGS. 2 and 3.

<Preparation Step>

Hexagonal boron nitride powder (hereinafter also referred to as hBN powder) and binder phase powder are prepared as a raw material for the cubic boron nitride sintered material. The hexagonal boron nitride powder has a purity (or contains hexagonal boron nitride at a ratio) preferably of 98.5% or more, more preferably 99% or more, most preferably 100%. While the grain size of the hexagonal boron nitride powder is not particularly limited, it may for example be 0.1 μm or more and 10 μm or less.

The binder powder is a powdery raw material for the binder phase included in the cBN sintered material. The binder powder can be powder including at least one selected from the group consisting of a simple substance selected from the group consisting of a group 4 element, a group 5 element and a group 6 element of the periodic table, aluminum, silicon, cobalt and nickel, an alloy thereof, and an intermetallic compound thereof. When two or more types of binder powder are used, each binder powder is weighed to have a prescribed blending ratio.

Subsequently, the binder powder is agitated and pulverized. While the binder powder is agitated and pulverized in any method, agitation and pulverization using a medium such as a ball, jet mill agitation and pulverization, and the like are preferable from the viewpoint of efficient and homogeneous agitation. The binder powder may be agitated and pulverized in a wet manner or a dry manner.

The hBN powder and binder powder prepared as described above are mixed together by wet ball mill-mixing using ethanol, acetone or the like as a solvent to prepare a powdery mixture. The hexagonal boron nitride powder and the binder powder are mixed at a ratio adjusted so that a finally obtained cubic boron nitride sintered material has cubic boron nitride grains at a ratio of 40% by volume or more and 96% by volume or less. The solvent is removed by air-drying after the mixing. Subsequently, a heat treatment is performed to volatilize impurities such as moisture adsorbed on the surface of the powdery mixture and thus clean the surface of the powdery mixture.

<Pretreatment Step>

Subsequently, an ultra-high pressure and temperature generator is used to pressurize the powdery mixture to a pressure of 0.5 GPa or more and 6 GPa or less while maintaining a temperature range of −50° C. or higher and 100° C. or lower (as indicated in FIG. 2 by arrow A1 and in FIG. 3 by arrow B1).

The pretreatment step can reduce gaps in the hexagonal boron nitride powder and expel unnecessary gas present in the powdery mixture out of the system. This can prevent degradation in quality attributed to a chemical reaction otherwise caused between the gas and the powdery mixture.

The pretreatment step can increase the powdery mixture in density to such an extent that further pressurizing does not substantially vary an external shape. The heating and pressurizing step can be performed in this state, which allows reliable manufacture.

The pretreatment step is performed preferably at a temperature held in a range of −50° C. or higher and 100° C. or lower, more preferably 0° C. or higher and 50° C. or lower. The pretreatment step is performed with ultimate pressure preferably of 0.5 GPa or more and 5 GPa or less, more preferably 1 GPa or more and 3 GPa or less.

In the method for manufacturing a cubic boron nitride sintered material according to the present embodiment, the pretreatment step is an optional step. Therefore, the heating and pressurizing step described below can be performed after the preparation step without performing the pretreatment step.

<Heating and Pressurizing Step>

Subsequently, the powdery mixture is heated to a temperature of 1900° C. or higher and 2400° C. or lower and pressurized to a pressure of 8 GPa or larger through a temperature and a pressure in the stable region of wurtzite boron nitride (as indicated in FIG. 2 by arrows A2, A3 and A4 and in FIG. 3 by arrows B2, B3 and B4). The heating and pressurizing step is performed along a route entering the stable region of wurtzite boron nitride at a temperature of 600° C. or higher.

In the present specification, a temperature at which a route enters the stable region of wurtzite boron nitride means a temperature at which the route first reaches the stable region of wurtzite boron nitride. In FIG. 2, the entry temperature is a temperature at an intersection of the arrow A3 and the line of P=−0.0037T+11.301 (i.e., about 1200° C.), and in FIG. 3, it is a temperature at an intersection of the arrow B3 and the line of P=−0.0037T+11.301 (i.e., about 600° C.).

When the pretreatment step is performed, then, the hexagonal boron nitride powder having undergone the pretreatment step is heated from the ultimate temperature reached at the end of the pretreatment step to a temperature of 1900° C. or higher and 2400° C. or lower and pressurized from the ultimate pressure reached at the end of the pretreatment step to a pressure of 8 GPa or larger through a temperature and a pressure in the stable region of wurtzite boron nitride. The heating and pressurizing step in this case is also performed along a route entering the stable region of wurtzite boron nitride at a temperature of 600° C. or higher.

The heating and pressurizing step is performed along a route entering the stable region of wurtzite boron nitride at a temperature of 600° C. or higher. According to this, hexagonal boron nitride powder is transformed into wurtzite boron nitride in an environment where atomic diffusion easily occurs, and thereafter transformed into cubic boron nitride. As a result, the obtained cubic boron nitride sintered material has reduced lattice defects and is thus enhanced in strength and toughness. Therefore, a tool using the cubic boron nitride sintered material can have a long tool life even in high-efficiency processing of a high-strength cast iron material.

The heating and pressurizing step is performed along a route entering the stable region of wurtzite boron nitride at a temperature preferably of 600° C. or higher, more preferably 1200° C. or higher. For higher entry temperature, atomic diffusion more easily occurs, and lattice defects tend to decrease. The entry temperature can have an upper limit value for example of 1500° C. or lower.

In the heating and pressurizing step, ultimate pressure is 8 GPa or more. While the upper limit of the ultimate pressure is not particularly limited, it can for example be 15 GPa or less. In the heating and pressurizing step, after the heating and pressurizing route has entered the stable region of wurtzite boron nitride, the pressure is preferably increased to 10 GPa or more.

The heating and pressurizing step can be held at a temperature and a pressure in the stable region of wurtzite boron nitride for example for 5 minutes or longer and 60 minutes or shorter.

In the heating and pressurizing step, when the routes shown in FIGS. 2 and 3 are followed, heating is initially performed followed by pressurizing followed by further heating. However, this is not exclusive. The heating and pressurizing may be done in any method following a route entering the stable region of wurtzite boron nitride at 600° C. or higher. For example, heating and pressurizing may be performed simultaneously.

Thus, a cubic boron nitride sintered material can be obtained by heating and pressurizing hexagonal boron nitride powder.

<Temperature and Pressure Holding Step>

After the above heating and pressurizing step, the step of holding the cubic boron nitride sintered material that is obtained through the heating and pressurizing step at a temperature of 1900° C. or higher and 2400° C. or lower (hereinafter also referred to as "the sintering temperature") and a pressure of 8 GPa or larger (hereinafter also referred to as "the sintering pressure") for 10 minutes or longer can be performed. A cubic boron nitride sintered material thus obtained contains cubic boron nitride at an increased ratio and can thus achieve a longer tool life.

The sintering temperature in the temperature and pressure holding step is preferably 1900° C. or higher and 2400° C. or lower, more preferably 2100° C. or higher and 2300° C. or lower. The sintering pressure in the temperature and pressure holding step is preferably 8 GPa or more and 15 GPa or less, more preferably 9 GPa or more and 12 GPa or less. The sintering time in the temperature and pressure holding step is preferably 10 minutes or longer and 60 minutes or shorter, more preferably 10 minutes or longer and 30 minutes or shorter.

<Characteristics of Cubic Boron Nitride Sintered Material Obtained Through Routes in FIGS. 2 and 3>

When the route in FIG. 2 is followed, the route enters the stable region of wurtzite boron nitride at a temperature of about 1200° C. According to this, hexagonal boron nitride powder is transformed into wurtzite boron nitride in an environment where atomic diffusion significantly easily occurs. For this reason, the wurtzite boron nitride has few lattice defects and a significantly low dislocation density. Thereafter, the wurtzite boron nitride is further heated and thus transformed into a cubic boron nitride sintered material. Therefore, the obtained cubic boron nitride sintered material has a significantly low dislocation density.

When the route in FIG. 3 is followed, the route enters the stable region of wurtzite boron nitride at a temperature of about 600° C. According to this, the hexagonal boron nitride powder is transformed into wurtzite boron nitride in an environment where atomic diffusion occurs. For this reason, the wurtzite boron nitride has few lattice defects and hence a low dislocation density. Thereafter, the wurtzite boron nitride is further heated and thus transformed into a cubic boron nitride sintered material. Therefore, the obtained cubic boron nitride sintered material has a low dislocation density.

When the cubic boron nitride sintered material obtained through the route in FIG. 2 is compared with the cubic boron nitride sintered material obtained through the route in FIG. 3, the former has a lower dislocation density than the latter. This is because it is believed that the route in FIG. 2 enters the stable region of wurtzite boron nitride at a higher temperature and thus facilitates atom diffusion.

EXAMPLES

The present embodiment will be described more specifically with reference to examples. Note, however, the present embodiment is not limited to these examples.

Test Example 1

<Samples 1 to 27>
(Preparation Step)
Hexagonal boron nitride powder (referred to as "hBN" in Tables 1 and 2) having an average grain diameter of 10 μm, and binder powder having compositions indicated at the "binder powder" column of the "preparation step" column in Tables 1 and 2 were prepared. For example, for sample 1, TiC, Ti, and Al were prepared as the binder powder.

The hexagonal boron nitride powder and the binder powder were mixed at ratios adjusted so that a finally obtained cubic boron nitride sintered material had cubic boron nitride grains at ratios indicated in the "cBN grains (vol %)" column of the "cubic boron nitride sintered material" column in Tables 1 and 2.

The hexagonal boron nitride powder and the binder powder were mixed for 5 hours using a ball mill. A powdery mixture was thus obtained. The powdery mixture underwent a heat treatment at a temperature of 2050° C. in a nitrogen atmosphere to remove impurities (i.e., a high-temperature purification treatment).

(Pretreatment Step)
The powdery mixture was introduced into a capsule made of molybdenum, and pressurized to a pressure of 5 GPa (indicated at the "1st pressure applied" column of the "pretreatment step" column in Tables 1 and 2) at 25° C. (room temperature, indicated at the "1st temperature" column of the "pretreatment step" column in Tables 1 and 2) using an ultra-high pressure and ultra-high temperature generator.

(Heating and Pressurizing Step)
Samples 1 to 26 were each heated until the ultra high-pressure and ultra high-temperature generator internally reached a temperature indicated at the "2nd temperature (wBN entry temperature)" column of the "heating and pressurizing step" column in Tables 1 and 2. While doing so, the ultra high-pressure and ultra high-temperature generator had an internal pressure held at a pressure indicated at the "1st pressured applied" column of the "pretreatment step" column in Tables 1 and 2.

Subsequently, the ultra high-pressure and ultra high-temperature generator had the internal pressure increased to a pressure indicated at the "2nd pressure applied" column of the "heating and pressuring step" column in Tables 1 and 2. During this time, the ultra high-pressure and ultra high-temperature generator's internal temperature and pressure were changed from those in the stable region of hexagonal boron nitride to those in the stable region of wurtzite boron nitride. The heating and pressurizing step was performed along a route entering the stable region of wurtzite boron nitride at a temperature indicated at the "2nd temperature (wBN entry temperature)" column of the "heating and pressurizing step" column in Tables 1 and 2.

Subsequently, the ultra-high pressure and ultra-high temperature generator's internal temperature was raised to a temperature indicated at the "3rd temperature" column of the "temperature and pressure holding step" column in Tables 1 and 2. While doing so, the ultra-high pressure and ultra-high temperature generator's internal pressure was held at a pressure indicated at the "2nd pressure applied" column of the "heating and pressurizing step" column in Tables 1 and 2.

Sample 27 was pressurized to a pressure indicated at the "2nd pressure applied" column of the "heating and pressurizing step" column in Table 2 (i.e., 10 GPa) while the first temperature in the pretreatment step (i.e., 25° C.) was maintained. During this time, the ultra high-pressure and ultra high-temperature generator's internal temperature and pressure were changed from those in the stable region of hexagonal boron nitride to those in the stable region of wurtzite boron nitride. The heating and pressurizing step was performed along a route entering the stable region of wurtzite boron nitride at a temperature indicated at the "2nd temperature (wBN entry temperature)" column of the "heating and pressurizing step" column in Table 2 (i.e., 25° C.).

Subsequently, the ultra-high pressure and ultra-high temperature generator's internal temperature was raised to a temperature indicated at the "3rd temperature" column of the "temperature and pressure holding step" column in Table 2 (i.e., 2200° C.). While doing so, the ultra-high pressure and ultra-high temperature generator's internal pressure was held at a pressure indicated at the "2nd pressure applied" column of the "heating and pressurizing step" column in Table 2 (i.e., 10 GPa).

(Temperature and Pressure Holding Step)
Cubic boron nitride sintered materials for samples 1 to 27 were each obtained by holding the intermediate product for a period of time indicated at the "holding time" column of the "temperature and pressure holding step" column in Tables 1 and 2 at a temperature and a pressure indicated at the "3rd temperature" and "3rd pressure" columns of the "temperature and pressure holding step" column in Tables 1 and 2.

<Sample 28>
The preparation step and the pretreatment step were performed in the same manner as for sample 4. After the pretreatment step, the ultra-high pressure and ultra-high temperature generator's internal temperature and pressure were increased to those indicated at the "3rd temperature" and "3rd pressure" columns of the "temperature and pressure holding step" column in Table 2 without passing through the wBN stable region, and held at the increased temperature and pressure to obtain a cubic boron nitride sintered material for sample 28.

<Evaluation>
(Composition of cBN Sintered Material)
The volumetric ratio between the cBN grains and the binder phase in the cBN sintered material was measured. How it was specifically measured will not be described as it is identical to that described in an embodiment for implementing the present invention, as has been described above. A result is shown at the "cBN grains (vol %)" and "binder phase (vol %)" columns of the "cubic boron nitride sintered material" column in Tables 1 and 2.

(Composition of Binder Phase)
The composition of the binder phase in the cBN sintered material was determined through XRD. A result is shown at the "binder phase composition" column of the "cubic boron nitride sintered material" column in Tables 1 and 2.

(Dislocation Density)

The dislocation density of the cBN grains in the cBN sintered material was measured. How it was specifically measured will not be described as it is identical to that described in an embodiment for implementing the present invention, as has been described above. A result is shown at the "cBN grain dislocation density (/m$^2$)" column of the "cubic boron nitride sintered material" column in Tables 1 and 2.

(Cutting Test)

The cBN sintered material of each sample thus produced was used to produce a cutting tool (substrate's shape: CNGA120408, cutting-edge treatment: T01215). Using this, a cutting test was performed under cutting conditions indicated below. The following cutting conditions are for high-speed continuous processing of ductile cast iron, and correspond to high-efficiency processing of high-strength cast iron.

workpiece: FCD700 (cutting an exterior of a round bar having a hardness of 250 HB and a circumference provided with a V-groove)
cutting speed Vc=500 m/min.
feed rate f=0.25 mm/rev.
cutting depth ap=0.25 mm
coolant: WET
cutting method: continuous end face cutting
evaluation method: Cutting edge was observed every one minute of cutting time, and a cutting time when the size of chipping reached 0.1 mm or more was defined as tool life. A result is indicated at the "tool life (min.)" column in Tables 1 and 2.

TABLE 1

| | preparation step | | pretreatment step | | heating & pressurizing step | | | | | | cubic boron nitride sintered material | | | | |
|---|---|---|---|---|---|---|---|---|---|---|---|---|---|---|---|
| | | | | | 2nd temperature (wBN | | temperature & pressure holding step | | | | cBN | binder | | cBN grain | |
| sample Nos. | raw material powder | binder powder | 1st pressure applied | 1st temperature | entry temperature) | 2nd pressure applied | 3rd temperature | 3rd pressure | holding time | | grain (vol %) | phase (vol %) | binder phase composition | dislocation density (/m$^2$) | tool life (min.) |
| 1 | hBN | TiC, Ti, Al | 5 GPa | 25° C. | 1200° C. | 10 GPa | 2200° C. | 10 GPa | 30 min. | | 35 | 65 | TiC, TiB$_2$(AlB$_2$), Al$_2$O$_3$ | 4.9 × 10$^{14}$ | 6 |
| 2 | hBN | TiC, Ti, Al | 5 GPa | 25° C. | 1200° C. | 10 GPa | 2200° C. | 10 GPa | 30 min. | | 40 | 60 | TiC, TiB$_2$(AlB$_2$), Al$_2$O$_3$ | 5.0 × 10$^{14}$ | 10 |
| 3 | hBN | TiC, Ti, Al | 5 GPa | 25° C. | 1200° C. | 10 GPa | 2200° C. | 10 GPa | 30 min. | | 45 | 55 | TiC, TiB$_2$(AlB$_2$), Al$_2$O$_3$ | 5.0 × 10$^{14}$ | 13 |
| 4 | hBN | TiC, Ti, Al | 5 GPa | 25° C. | 1200° C. | 10 GPa | 2200° C. | 10 GPa | 30 min. | | 60 | 40 | TiC, TiB$_2$(AlB$_2$), Al$_2$O$_3$ | 5.0 × 10$^{14}$ | 15 |
| 5 | hBN | TiC, Ti, Al | 5 GPa | 25° C. | 1200° C. | 10 GPa | 2200° C. | 10 GPa | 30 min. | | 80 | 20 | TiC, TiB$_2$(AlB$_2$), Al$_2$O$_3$ | 5.2 × 10$^{14}$ | 12 |
| 6 | hBN | TiC, Ti, Al | 5 GPa | 25° C. | 1200° C. | 10 GPa | 2200° C. | 10 GPa | 30 min. | | 90 | 10 | TiC, TiB$_2$(AlB$_2$), Al$_2$O$_3$ | 5.3 × 10$^{14}$ | 11 |
| 7 | hBN | TiC, Ti, Al | 5 GPa | 25° C. | 1200° C. | 10 GPa | 2200° C. | 10 GPa | 30 min. | | 96 | 4 | TiC, TiB$_2$(AlB$_2$), Al$_2$O$_3$ | 5.2 × 10$^{14}$ | 10 |
| 8 | hBN | TiC, Ti, Al | 5 GPa | 25° C. | 1200° C. | 10 GPa | 2200° C. | 10 GPa | 30 min. | | 98 | 2 | TiC, TiB$_2$(AlB$_2$), Al$_2$O$_3$ | 5.4 × 10$^{15}$ | 7 |
| 9 | hBN | TiC | 5 GPa | 25° C. | 1200° C. | 10 GPa | 2200° C. | 10 GPa | 30 min. | | 60 | 40 | TiC | 5.2 × 10$^{14}$ | 12 |
| 10 | hBN | TiC, Ti | 5 GPa | 25° C. | 1200° C. | 10 GPa | 2200° C. | 10 GPa | 30 min. | | 60 | 40 | TiC, TiB$_2$ | 5.3 × 10$^{14}$ | 12 |
| 11 | hBN | TiN, Ti, Al | 5 GPa | 25° C. | 1200° C. | 10 GPa | 2200° C. | 10 GPa | 30 min. | | 60 | 40 | TiN, TiB$_2$(AlB$_2$), Al$_2$O$_3$ | 5.3 × 10$^{14}$ | 12 |
| 12 | hBN | TiC, TiN, Ti, Al | 5 GPa | 25° C. | 1200° C. | 10 GPa | 2200° C. | 10 GPa | 30 min. | | 60 | 40 | TiC, TiN, TiB$_2$(AlB$_2$), Al$_2$O$_3$ | 5.2 × 10$^{14}$ | 12 |
| 13 | hBN | WC | 5 GPa | 25° C. | 1200° C. | 10 GPa | 2200° C. | 10 GPa | 30 min. | | 60 | 40 | WC | 5.5 × 10$^{14}$ | 11 |
| 14 | hBN | WC, Co | 5 GPa | 25° C. | 1200° C. | 10 GPa | 2200° C. | 10 GPa | 30 min. | | 60 | 40 | W$_2$Co$_2$C$_6$, CoWB | 5.3 × 10$^{14}$ | 11 |
| 15 | hBN | WC, Co, Al | 5 GPa | 25° C. | 1200° C. | 10 GPa | 2200° C. | 10 GPa | 30 min. | | 60 | 40 | W$_3$Co$_3$C, W$_2$Co$_{21}$B$_6$, AlB$_2$, Al$_2$O$_3$ | 5.6 × 10$^{14}$ | 11 |
| 16 | hBN | TiC | 5 GPa | 25° C. | 1200° C. | 10 GPa | 2200° C. | 10 GPa | 30 min. | | 90 | 10 | TiC | 5.4 × 10$^{14}$ | 10 |

TABLE 2

| sample Nos. | preparation step | | pretreatment step | | heating & pressurizing step | | | temperature & pressure holding step | | | cubic boron nitride sintered material | | | | |
|---|---|---|---|---|---|---|---|---|---|---|---|---|---|---|---|
| | | | | | 2nd temperature (wBN | | | | | | cBN | binder | | cBN grain | |
| | raw material powder | binder powder | 1st pressure applied | 1st temperature | entry temperature) | 2nd pressure applied | | 3rd temperature | 3rd pressure | holding time | grain (vol %) | phase (vol %) | binder phase composition | dislocation density (/m²) | tool life (min.) |
| 17 | hBN | TiC, Ti | 5 GPa | 25° C. | 1200° C. | 10 GPa | | 2200° C. | 10 GPa | 30 min. | 90 | 10 | TiC, TiB₂ | 5.3 × 10¹⁴ | 10 |
| 18 | hBN | TiC, Ti, Al | 5 GPa | 25° C. | 1200° C. | 10 GPa | | 2200° C. | 10 GPa | 30 min. | 90 | 10 | TiN, TiB₂(AlB₂), Al₂O₃ | 5.5 × 10¹⁴ | 10 |
| 19 | hBN | TiC, TiN, Ti, Al | 5 GPa | 25° C. | 1200° C. | 10 GPa | | 2200° C. | 10 GPa | 30 min. | 90 | 10 | TiC, TiN, TiB₂(AlB₂), Al₂O₃ | 5.4 × 10¹⁴ | 10 |
| 20 | hBN | WC | 5 GPa | 25° C. | 1200° C. | 10 GPa | | 2200° C. | 10 GPa | 30 min. | 90 | 10 | WC | 5.5 × 10¹⁴ | 11 |
| 21 | hBN | WC, Co | 5 GPa | 25° C. | 1200° C. | 10 GPa | | 2200° C. | 10 GPa | 30 min. | 90 | 10 | W₂Co₂C₆, CoWB | 5.4 × 10¹⁴ | 11 |
| 22 | hBN | WC, Co, Al | 5 GPa | 25° C. | 1200° C. | 10 GPa | | 2200° C. | 10 GPa | 30 min. | 90 | 10 | W₃Co₃C, W₂Co₂₁B₆, AlB₂, Al₂O₃ | 5.4 × 10¹⁴ | 11 |
| 23 | hBN | TiC, Ti, Al | 5 GPa | 25° C. | 1200° C. | 10 GPa | | 2200° C. | 10 GPa | 15 min. | 60 | 40 | TiC, TiB₂(AlB₂), Al₂O₃ | 2.5 × 10¹⁴ | 17 |
| 24 | hBN | TiC, Ti, Al | 5 GPa | 25° C. | 900° C. | 10 GPa | | 2200° C. | 10 GPa | 30 min. | 60 | 40 | TiC, TiB₂(AlB₂), Al₂O₃ | 8.0 × 10¹⁴ | 14 |
| 25 | hBN | TiC, Ti, Al | 5 GPa | 25° C. | 600° C. | 10 GPa | | 2200° C. | 10 GPa | 30 min. | 60 | 40 | TiC, TiB₂(AlB₂), Al₂O₃ | 9.9 × 10¹⁴ | 12 |
| 26 | hBN | TiC, Ti, Al | 5 GPa | 25° C. | 300° C. | 10 GPa | | 2200° C. | 10 GPa | 30 min. | 60 | 40 | TiC, TiB₂(AlB₂), Al₂O₃ | 8.3 × 10¹⁵ | 7 |
| 27 | hBN | TiC, Ti, Al | 5 GPa | 25° C. | 25° C. | 10 GPa | | 2200° C. | 10 GPa | 30 min. | 60 | 40 | TiC, TiB₂(AlB₂), Al₂O₃ | 1.1 × 10¹⁷ | 6 |
| 28 | hBN | TiC, Ti, Al | 5 GPa | 25° C. | not via wBN | 10 GPa | | 2200° C. | 10 GPa | 30 min. | 60 | 40 | TiC, TiB₂(AlB₂), Al₂O₃ | 1.9 × 10¹⁷ | 6 |

Discussion

The cBN sintered materials of Samples 2 to 7 and 9 to 25 correspond to examples.

The cBN sintered material of sample 1 contains cBN grains at a ratio of less than 40% by volume and corresponds to a comparative example. The cBN sintered material of sample 8 contains cBN grains at a ratio exceeding 96% by volume and the cBN grains have a dislocation density of $1 \times 10^{15}/m^2$ or more, and corresponds to a comparative example. The cBN sintered materials of samples 26 to 28 contain cBN grains having a dislocation density of $1 \times 10^5/m^2$ and correspond to comparative examples.

It has been confirmed that tools using the cBN sintered materials of samples 2 to 7 and samples 9 to 25 corresponding to the examples have a longer tool life than those using the cBN sintered materials of samples 1, 8 and 26 to 28 corresponding to the comparative examples. This is presumably because samples 2 to 7 and samples 9 to 25 corresponding to the examples have been improved in thermal conductivity and thus allow a tool to have a rake face enhanced in fracture resistance.

While sample 1 does have cBN grains with a small dislocation density, the grains are contained at an excessively low ratio of 35% by volume, which provides insufficient hardness, and it is thus inferred that the tool is fracturable.

Sample 8 contains cBN grains at a high ratio so that the grains' dislocation density becomes high, and it is thus inferred that fracture is more likely to occur.

From samples 9 to 22, it has been confirmed that a tool using a cBN sintered material including a binder of a type as shown in Tables 1 and 2 also has a long tool life.

When samples 4, 24, and 25 are compared, it has been confirmed that when the heating and pressurizing step is performed along a route entering the wBN stable region at a higher temperature, cBN grains have a smaller dislocation density, and the tool tends to have an extended life.

For samples 26 and 27, the heating and pressurizing step was performed along a route entering the wBN stable region at a low temperature, and cBN grains had an increased dislocation density, resulting in reduced tool life. For samples 26 and 27, in the heating and pressurizing step when hBN is transformed into wBN, atomic diffusion does not easily occur, which is believed to provide increased dislocation density.

Sample 28 did not pass through the wBN stable region in the manufacturing process, and thus had cBN grains with an increased dislocation density and provided a reduced tool life. While sample 28 was transformed from hBN directly into cBN in the manufacturing process, hBN and cBN have significantly different crystal structures, and when it undergoes phase transition, lattice defects easily occur, and it is thus believed that an increased dislocation density is provided.

Test Example 2

<Sample 4>

Sample 4 is the same cBN sintered material as sample 4 of test example 1 described above.

<Sample 29>

(Preparation Step)

Cubic boron nitride powder (referred to as "cBN" in Table 3) having an average grain diameter of 2 μm, and binder powder having a composition indicated at the "binder powder" column of the "preparation step" column in Table 3 were prepared. The prepared cBN powder was what had been produced in a known method using a catalyst.

It is known that cubic boron nitride powder is produced by treating hexagonal boron nitride and a catalyst at high temperature and high pressure that are a condition for thermally stabilizing cBN. As the catalyst, an alkali metal element (lithium), an alkaline earth metal element (magnesium, calcium, strontium, beryllium, barium) or the like is generally used. Therefore, the obtained cubic boron nitride powder includes a catalytic element.

The cubic boron nitride powder and the binder powder were mixed at a ratio adjusted so that a finally obtained cubic boron nitride sintered material had cubic boron nitride grains at a ratio indicated in the "cBN grains (vol %)" column of the "cubic boron nitride sintered material" column in Table 3.

The cubic boron nitride powder and the binder powder were mixed for 5 hours using a ball mill. A powdery mixture was thus obtained. The powdery mixture underwent a heat treatment at a temperature of 2050° C. in a nitrogen atmosphere to remove impurities (i.e., a high-temperature purification treatment).

(Pretreatment Step)

The powdery mixture was introduced into a capsule made of molybdenum, and pressurized to a pressure of 5 GPa (indicated at the "1st pressure applied" column of the "pretreatment step" column in Table 3) at 25° C. (room temperature, indicated at the "1st temperature" column of the "pretreatment step" column in Table 3) using an ultra-high pressure and ultra-high temperature generator.

(Heating and Pressurizing Step)

Subsequently, while the ultra high-pressure and ultra high-temperature generator's internal temperature was maintained at 25° C., the powdery mixture was pressurized to 6 GPa (indicated at the "2nd pressure applied" column of the "heating and pressurizing step" column in Table 3). During this time, the ultra high-pressure and ultra high-temperature generator's internal temperature and pressure were changed from those in the stable region of hexagonal boron nitride to those in the stable region of wurtzite boron nitride. The heating and pressurizing step was performed along a route entering the stable region of wurtzite boron nitride at 25° C. (indicated at the "2nd temperature (wBN entry temperature)" column of the "heating and pressurizing step" column in Table 3).

Subsequently, the ultra-high pressure and ultra-high temperature generator's internal temperature was raised to 1400° C. (indicated at the "3rd temperature" column of the "temperature and pressure holding step" column in Table 3). While doing so, the ultra-high pressure and ultra-high temperature generator's internal pressure was held at 6 GPa (indicated at the "2nd pressure applied" column of the "heating and pressurizing step" column in Table 3).

(Temperature and Pressure Holding Step)

A cubic boron nitride sintered material for sample 29 was obtained by holding the intermediate product in the ultra-high pressure and ultra-high temperature generator with its internal temperature and pressure at 1400° C. and 6 GPa, respectively, for 30 minutes (indicated at the "holding time" column of the "temperature and pressure holding step" column in Table 3).

<Sample 30>

(Preparation Step)

For sample 30, a cubic boron nitride sintered material was produced in the same method as sample 4 except that as a raw material powder, hBN powder was replaced with inversely transformed hexagonal boron nitride powder (hereinafter also referred to as "inversely transformed hBN powder") produced in the following procedure. The inversely transformed hBN powder was prepared by subjecting the cubic boron nitride powder prepared for sample 29 to a heat treatment at 1600° C. to inversely transform cBN to hBN.

<Evaluation>

(Composition of cBN Sintered Material, Composition of Binder Phase, and Dislocation Density of cBN Grains)

The produced cBN sintered materials have each been confirmed regarding the composition of the cBN sintered material, the composition of the binder phase, and the dislocation density of the cBN grains. How they were specifically measured will not be described as it is identical to a method described in an embodiment for implementing the present invention, as has been described above. A result is shown in Table 3.

(Catalytic Element Content)

The produced cBN sintered materials each had its cBN grains' catalytic element content measured through high-frequency inductively coupled plasma emission spectrometry (ICP emission spectroscopy), using equipment "ICPS-8100" (trademark) manufactured by Shimadzu Corporation. Specifically, the catalytic element content was measured in the following procedure.

Initially, the cubic boron nitride sintered material was introduced into and sealed in a container and therein immersed in fluoronitric acid for 48 hours to dissolve the binder phase in the fluoronitric acid. The cubic boron nitride grains remaining in the fluoronitric acid were subjected to high frequency inductively coupled plasma emission spectrometry to measure each catalytic element's content.

(Cutting Test)

The cBN sintered material of each sample produced was used to produce a cutting tool (substrate's shape: CNGA120408, cutting-edge treatment: T01215). Using this, a cutting test was performed under the same cutting conditions as test example 1. The cutting conditions are for high-speed continuous processing of ductile cast iron, and correspond to high-efficiency processing of high-strength cast iron. A result is indicated at the "tool life" column in Table 3.

TABLE 3

| | preparation step | | pretreatment step | | heating & pressurizing step | | | | | | cubic boron nitride sintered material | | | | |
|---|---|---|---|---|---|---|---|---|---|---|---|---|---|---|---|
| sample Nos. | raw material powder | binder powder | 1st pressure applied | 1st temperature | 2nd temperature (wBN entry temperature) | 2nd pressure applied | temperature & holding step 3rd temperature | 3rd pressure | holding time | cBN grain (vol %) | binder phase (vol %) | binder phase composition | cBN grain dislocation density (/m²) | catalytic element content (wt %) | tool life (min.) |
| 4 | hBN | TiC, Ti, Al | 5 GPa | 25° C. | 1200° C. | 10 GPa | 2200° C. | 10 GPa | 30 min. | 60 | 40 | TiC, TiB$_2$(AlB$_2$), Al$_2$O$_3$ | 5.4 × 10$^{14}$ | not detected | 13 |
| 29 | cBN | TiC, Ti, Al | 5 GPa | 25° C. | 25° C. | 6 GPa | 1400° C. | 6 GPa | 30 min. | 60 | 40 | TiC, TiB$_2$(AlB$_2$), Al$_2$O$_3$ | 2.6 × 10$^{17}$ | Li:0.025, Mg:0.015 | 6 |
| 30 | transformed hBN | TiC, Ti, Al | 5 GPa | 25° C. | 1200° C. | 10 GPa | 2200° C. | 10 GPa | 30 min. | 60 | 40 | TiC, TiB$_2$(AlB$_2$), Al$_2$O$_3$ | 5.8 × 10$^{14}$ | Li:0.019, Mg:0.010 | 12 |

Discussion

The cBN sintered materials of samples 4 and 30 correspond to examples.

The cBN sintered material of sample 29 includes cBN grains having a dislocation density of $1 \times 10^{15}/m^2$ and corresponds to a comparative example.

It has been confirmed that tools using the cBN sintered materials of samples 4 and 30 corresponding to examples have a longer tool life than that using the cBN sintered material of sample 29 corresponding to a comparative example. This is presumably because samples 4 and 30 corresponding to examples have been improved in thermal conductivity and thus allow the tools to have a rake face enhanced in fracture resistance.

From sample 30, it has been confirmed that a cBN sintered material including a small amount of a catalytic element also has excellent tool performance.

While embodiments and examples of the present disclosure have been described as above, it is also planned from the beginning that the configurations of the above-described embodiments and examples are appropriately combined and variously modified.

The embodiments and examples disclosed herein are illustrative in any respect and should not be construed as being restrictive. The scope of the present invention is shown not by the above-described embodiments and examples but by the claims, and is intended to include all modifications within the scope and meaning equivalent to the claims.

The invention claimed is:

1. A cubic boron nitride sintered material comprising 40% by volume or more and 96% by volume or less of cubic boron nitride grains and 4% by volume or more and 60% by volume or less of a binder phase,
the cubic boron nitride grains having a dislocation density of less than $1 \times 10^{15}/m^2$.

2. The cubic boron nitride sintered material according to claim 1, wherein the binder phase includes:
at least one selected from the group consisting of: a material made of a single element selected from the group consisting of a group 4 element, a group 5 element, and a group 6 element of the periodic table, aluminum, silicon, cobalt, and nickel; an alloy thereof; and an intermetallic compound thereof;
at least one selected from the group consisting of: a compound consisting of at least one element selected from the group consisting of a group 4 element, a group 5 element, and a group 6 element of the periodic table, aluminum, silicon, cobalt, and nickel, and at least one element selected from the group consisting of nitrogen, carbon, boron, and oxygen; and a solid solution derived from the compound; or
at least one selected from the group consisting of a material made of a single element selected from the group consisting of a group 4 element, a group 5 element, and a group 6 element of the periodic table, aluminum, silicon, cobalt, and nickel, an alloy thereof, and an intermetallic compound thereof; and at least one selected from the group consisting of a compound consisting of at least one element selected from the group consisting of a group 4 element, a group 5 element, and a group 6 element of the periodic table, aluminum, silicon, cobalt, and nickel and at least one element selected from the group consisting of nitrogen, carbon, boron, and oxygen, and a solid solution derived from the compound.

3. The cubic boron nitride sintered material according to claim 1, wherein the dislocation density is calculated using a modified Williamson-Hall method and a modified Warren-Averbach.

4. The cubic boron nitride sintered material according to claim 3, wherein by a relationship of an expression $<\varepsilon(L)^2> = (\rho C b^2/4\pi)\ln(R_e/L)$ and an expression $\ln A(L) = \ln A^S(L) - (\pi L^2 \rho b^2/2) \ln(R_e/L)(K^2 C) + O(K^2 C)^2$ the dislocation density is determined, where b represents Burgers vector, ρ represents dislocation density, K represents a scattering vector, C represents an average contrast factor, $O(K^2 C)$ represents a higher-order term of $K^2 C$, $R_e$ represents dislocation's effective radius, A(L) represents a Fourier series, $A^S(L)$ represents a Fourier series for a crystallite size, and L represents a Fourier length.

5. A method for manufacturing a cubic boron nitride sintered material according to claim 1, comprising:
preparing hexagonal boron nitride powder and binder powder; and
heating and pressurizing the hexagonal boron nitride powder and the binder powder to a temperature of 1900° C. or higher and 2400° C. or lower and a pressure of 8 GPa or larger through a temperature and a pressure in a stable region of wurtzite boron nitride, the stable region of wurtzite boron nitride simultaneously satisfying Formulae 1 and 2:

$$P \geq -0.0037T + 11.301, \text{ and} \qquad \text{Formula 1}$$

$$P \geq -0.085T + 117, \qquad \text{Formula 2}$$

where T represents temperature in ° C. and P represents pressure in GPa, the heating and pressurizing step being performed along a route entering the stable region of wurtzite boron nitride at a temperature of 600° C. or higher.

* * * * *

UNITED STATES PATENT AND TRADEMARK OFFICE
CERTIFICATE OF CORRECTION

PATENT NO. : 11,434,550 B2
APPLICATION NO. : 16/967572
DATED : September 6, 2022
INVENTOR(S) : Machiko Abe, Satoru Kukino and Michiko Matsukawa It is certified that error appears in the above-identified patent and that said Letters Patent is hereby corrected as shown below:

In the Claims

In Claim 4, Column 26, Lines 54-55, "p represents" should read "ρ represents".

In Claim 5, Column 27, Line 7, "$P \geq -0.085T+117$" should read "$P \leq -0.085T+117$".

Signed and Sealed this
Sixth Day of December, 2022

Katherine Kelly Vidal
*Director of the United States Patent and Trademark Office*